United States Patent [19]

Long

[11] Patent Number: 5,675,920

[45] Date of Patent: Oct. 14, 1997

[54] ANIMAL EAR NUMBER TAG

[76] Inventor: Chen-Chen Long, No. 310, Chung Shan S. Rd., Yangmei, Taoyuan, Taiwan

[21] Appl. No.: 633,016

[22] Filed: Apr. 16, 1996

[51] Int. Cl.$^6$ ............................................. G09F 3/00
[52] U.S. Cl. .................. 40/301; 63/12; 63/13; 374/162
[58] Field of Search ................ 63/12, 13; 40/301; 374/162

[56] References Cited

U.S. PATENT DOCUMENTS

| | | | |
|---|---|---|---|
| 1,282,750 | 10/1918 | Byrd | 40/301 |
| 2,799,167 | 7/1957 | Loconti | 374/162 |
| 3,695,903 | 10/1972 | Telkes et al. | 374/162 X |
| 3,785,336 | 1/1974 | Roszkowski | 374/162 X |
| 3,877,411 | 4/1975 | MacDonald | 374/162 X |
| 4,030,482 | 6/1977 | Navato | 374/162 |
| 4,228,761 | 10/1980 | Glover et al. | 374/162 X |
| 4,353,370 | 10/1982 | Evans | 63/12 X |
| 4,854,328 | 8/1989 | Pollack | 128/736 |
| 5,008,136 | 4/1991 | Chamberlain | 374/162 X |
| 5,016,369 | 5/1991 | Parry | 40/301 |
| 5,465,593 | 11/1995 | Takasu | 63/12 |

FOREIGN PATENT DOCUMENTS 6-292607  10/1994  Japan ........................................ 63/12

*Primary Examiner*—Anthony Knight
*Assistant Examiner*—Andrea Chop
*Attorney, Agent, or Firm*—Morton J. Rosenberg; David I. Klein

[57] ABSTRACT

An animal number ear tag is provided that consists of an improved number tag element that is fastened to a lock pin and is suspended from the ear of an animal. The entire surface area of the lock pin is plated or coated with a layer of temperature-sensitive ink and when the set temperature of the aforesaid temperature-sensitive ink is exceeded, an instantaneous color difference is manifested. The lock pin is in contact with the skin of the animal's ear, therefore, the lock pin not only provides for the ensured positioning of the number tag element, but also indicates whether the animal develops a fever during the growth process. Since such a phenomenon is immediately observed, treatment can be applied earlier, thereby effectively providing for the reduction of unnecessary losses and degree of danger to the animal.

1 Claim, 3 Drawing Sheets

ANIMAL EAR NUMBER TAG

BACKGROUND OF THE INVENTION

Animal husbandrymen that raise animals (such as cattle, pigs, sheep, etc.) often utilize ear tags as a means of segregating and monitoring the growth process by the assignment of physical markings (such as ear perforations and punched holes) or by suspended ear number tags (as indicated in FIG. 1), thereby enabling work personnel to rapidly and conveniently verify the categorization and tracing operations at any time whatsoever; the aforesaid means of ear perforations and punch holes for marking animals is only effective in limited numbers due to the nature of the shape and is, furthermore, not practical on animals having lengthy for growth that obstructs visual inspection; therefore, the scope of application is often limited to small-scale animal yards and short-haired animals (such as pigs) and cannot be practically utilized on a comprehensive scale in all animal yards; however, the approach of suspending an ear number tag (1) on the ear (A), as indicated in FIG. 1 and FIG. 2) essentially consists of a lock pin (10) that is crimped under powerful pressure and directly pierced through ear (A) of an animal, while the aforesaid number tag (11) fastened tightly by the crowns (11) of the lock pin (10) to prevent loosening, and the virtually unlimited and variable range of number combinations possible on the aforesaid number tag (11) facilitate identification as well as the immunity of aforesaid number tag (11) from being obscured by fur provide for a clear means of observation and, therefore, in terms of actual practicality, when compared with the aforesaid ear perforation and hole punching as a means of marking animals, the suspended ear number tag obviously meets the requirements of an effective utilization method that can be applied as a extensive and normal scale in both large and small animal yards.

Since the aforesaid method of suspending a number tag from the ear of an animal is straightforward, very simple to install and convenient and, furthermore, is effectively uncomplicated, convenient and active in the rapid inspection and categorization of animals and, therefore, in actual utilization is sure to be welcomed and widely utilized by the animal husbandry industry, and the inventor of the invention herein is knowledgeable that the major purpose of suspending ear number tags on the ears of animals is to scientifically monitor and record a range of figures (including feeding volume, weight and other experimental figures, etc.) relating to animal growth processes so the optimum health conditions of the animals can be maintained. However, the inventor of the invention herein is also aware that all animals are susceptible to contagious disease organisms and sickness during the process of growth and according to the conventional knowledge of animal illness mechanisms, most are transmitted by the animal husbandrymen through feeding and degree of activity, and regarding the aforesaid mechanism, experienced managers can provide the information as to the proper clinical treatment measures, however, working personnel having less experience and in cases where the situation is not immediately understood, the danger of prolonged illness frequently occurs, and in actuality, in medium- and large-size animal yards, since the animals are fed in great number and, furthermore, due to the degree of resistance against disease by each animal species as well as the post-contagion reaction and different interacting conditions, errors or cases of erroneous judgment frequently occur and even among experienced management personnel; therefore, the reliance on experience to determine whether animals are ill is not only a serious responsibility of work personnel, it is also imprecise and subject to frequent error, which is obviously subject to the disadvantage of severe loss, and the installation of conventional ear number tags as means of determining whether animals have contracted disease offers little if any assistance, can only provide for post-clinical evaluations of the illness and are only useful for segregating sick animals.

In view of the foregoing situation, the inventor of the invention herein has many years of actual experience in various a veterinary instrument development and manufacturing and in coordination with studies having scientific support commenced in the development of an ear number tag that would be welcomed in the field and which culminated in a multifunctional ear number tag capable of indicating whether an animal was sick.

Therefore, the primary objective of the invention herein is to provide a kind of improved animal-use ear number tag, wherein the entire surface area of the lock pin is plated or coated with a layer of temperature-sensitive ink, and when the pressure reaction of the aforesaid temperature-sensitive ink exceeds the set heat value, a different color is instantly displayed and, after piercing the lock pin into the ear of an animal, the lock pin contacts the skin and actively reacts to the temperature of the animal and naturally, the invention herein not only provides a means of effectively positioning the number tag, but with respect to whether an animal has become sick and feverish, provides a instantaneous and simple observation means that effectively enables earlier treatment and reduces unnecessary losses and endangerment.

Another objective of the invention herein is to provide a kind of improved animal ear number tag that is extremely simple in structure, very easy and convenient to utilize, and after the animal ear tag is installed, the invention herein is not only facilitates animal categorization and serves as means of monitoring animal growth process, but also indicates whether an animal is sick and has developed a fever, and offers an visual means of diagnosis that is timely, instant, simple and convenient, which complies with the requirements of actual practicality, idealness and progressiveness and, furthermore, such an improved animal ear number tag does not exist at present.

To enable the examination committee to further understand and recognize the objectives, innovations and effectiveness of the invention herein, the brief description of the drawings and the detail description of the invention herein are attached below:

DETAILED DESCRIPTION OF THE INVENTION

Figure 1:
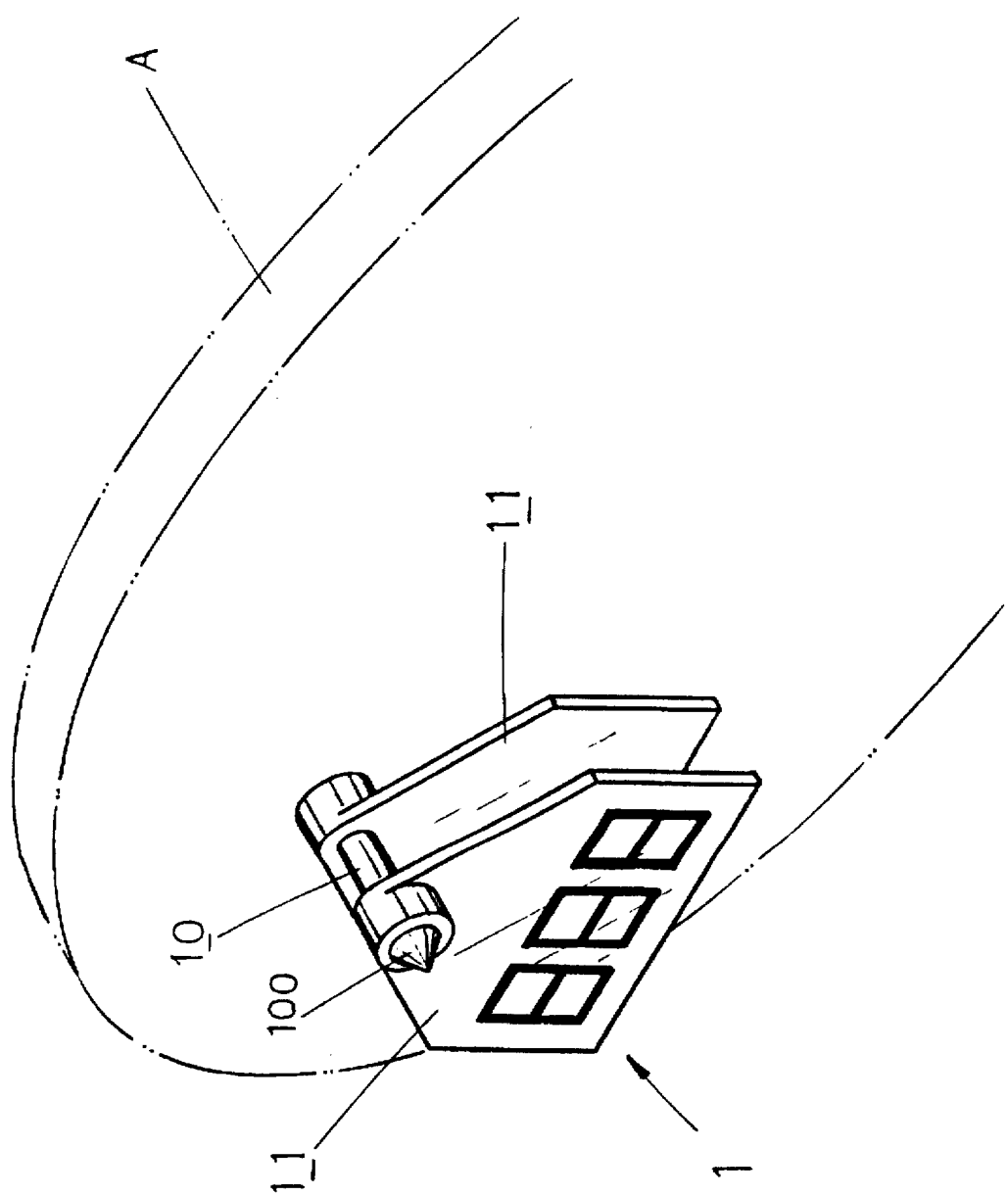
FIG. 1 is an isometric drawing of a conventional animal ear number tag.
Figure 2:
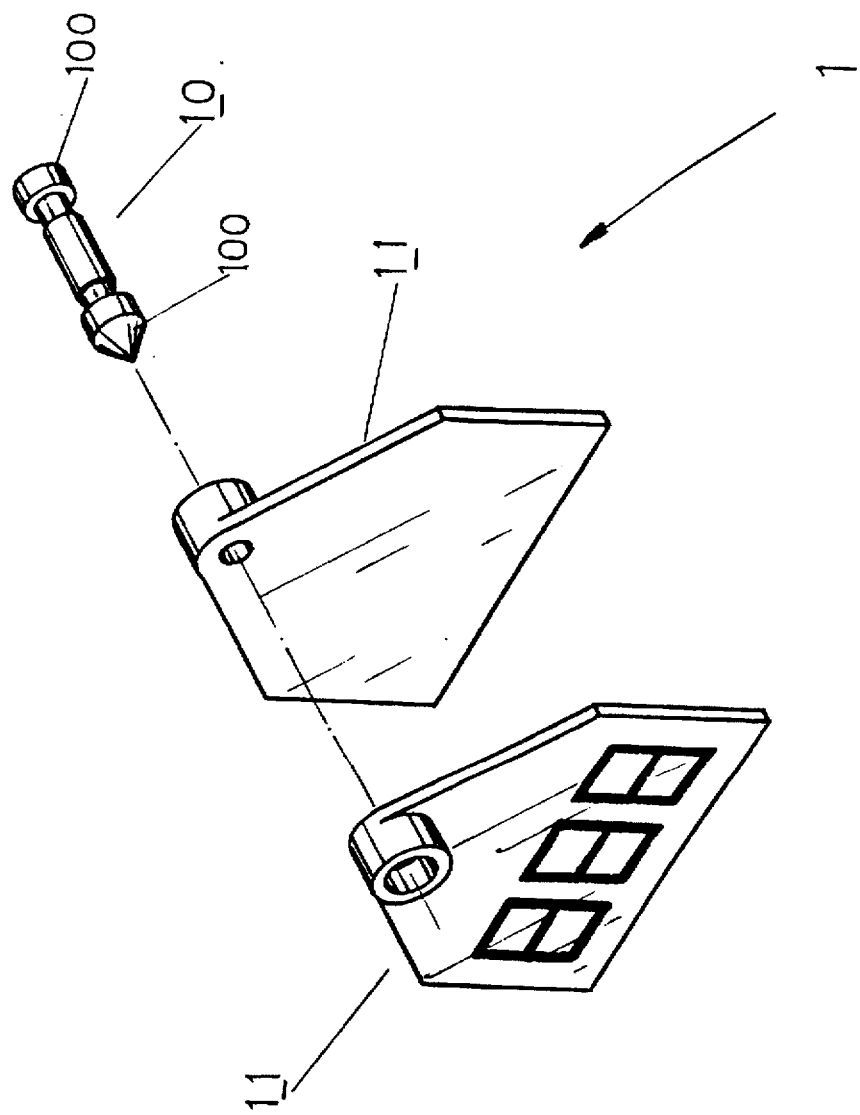
FIG. 2 is an isometric exploded drawing of a conventional animal ear tag structure.
Figure 3:
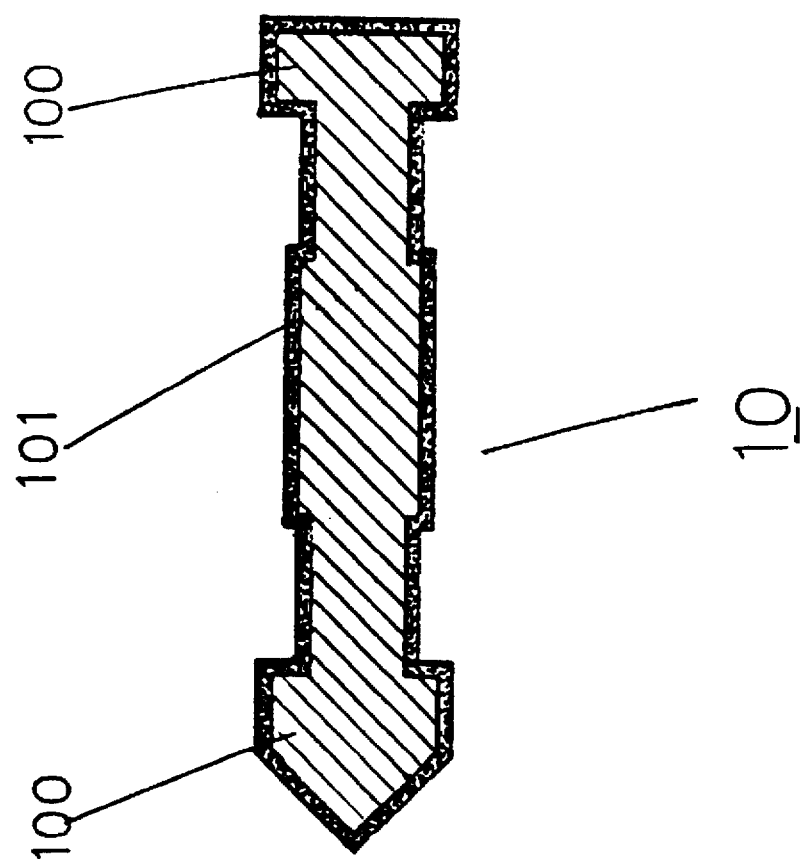
FIG. 3 is a cross-sectional drawing of the lock pin of the animal ear number tag invention herein.

As clearly indicated in FIG. 3, the invention herein is a kind of improved animal ear number tag that pierces through the ear (A) of the animal and provides for a number tag (11) that is suspended in position on a lock pin (10) that is improved through simplification and mainly consists of a lock pin (10) having a coated cylindrical surface or treated with a layer of temperature-sensitive ink (101) and the aforesaid temperature-sensitive ink (101) is utilized because there is an immediate change in color due to the heat produced in reaction whenever the pressure exceeds a given value and, therefore, can display an immediate indication if an animal becomes ill and develops a fever during the process of growth; and although the aforesaid temperature-sensitive ink is already utilized in aquariums as a thermometer, the invention herein involves the simple integrated utilization on the lock pin (10) of an animal-use ear number tag (1) so that when animal husbandry management personnel observe the ear number tag (1), such personnel can clearly and naturally determine whether an animal is sick and has a fever which is unlike the utilization of the conventional thermometer in that the invention herein is secured appropriately to the ear of an animal and utilized as an ear number tag through an innovative design that provides the ear number tag with the multiple functionality, which complies with the criteria of progressiveness in practical application. After the lock pin (10) is crimped under powerful compression directly onto the ear (A) of an animal, the cylindrical surface of the aforesaid lock pin is securely fixed to the outer skin of the animal's ear and thereby measures the body temperature of the animal through pressure sensitivity and, therefore, with the entire cylindrical surface coated with temperature-sensitive ink (101), when a fever occurs in the animal due to viral infection, the color of the aforesaid lock pin (10) changes in an immediate reaction, enabling animal husbandry management personnel during routine observation of the ear number tag (1) to have simultaneous knowledge and, furthermore, verification thereof; due to the utilization of the two crowns (100) exposed on the number tag (11), when the lock pin (10) changes color in a reaction, the animal husbandry personnel can easily and conveniently ascertain which animal has become ill and feverish, and immediately take effective preventative action and thereby effectively achieve the objectives of reducing unnecessary losses and decreasing the degree of endangerment.

Since the lock pin (10) of the invention herein is plated or coated with temperature-sensitive ink (101) and can be equipped with or without an animal ear number tag (1) and, furthermore, in actual installation, observation and inspection operations, involves no increase in effort and is at the same time is easy, convenient and economical in performance, therefore, in terms of actual application, is simple to fabricate and is of progressive and ideal structure, which illustrates one of the true design advantages of the invention herein.

What is claimed is:

1. An improved animal ear number tag, comprising:

a lock pin adapted to pierce a portion of an animal's ear, said lock pin having an outer substantially cylindrical surface and a pair of crowns formed on opposing ends of said lock pin, said outer surface having a temperature sensitive coating formed thereon for changing a color of said lock pin responsive to a change in a body temperature of the animal; and, at least one number tag member fastened to a respective one of said pair of crowns for suspension from the animal's ear.

* * * * *